US012499661B2

(12) United States Patent
Wang et al.

(10) Patent No.: US 12,499,661 B2
(45) Date of Patent: Dec. 16, 2025

(54) COLLABORATIVE ACTIVE LEARNING CLASSIFICATION METHOD FOR HYPERSPECTRAL IMAGES BASED ON CAPSULE NETWORKS

(71) Applicant: Dalian Minzu University, Dalian (CN)

(72) Inventors: Liguo Wang, Dalian (CN); Heng Wang, Dalian (CN); Danfeng Liu, Dalian (CN); Ying Xiao, Dalian (CN); Haitao Liu, Dalian (CN)

(73) Assignee: Dalian Minzu University, Dalian (CN)

( * ) Notice: Subject to any disclaimer, the term of this patent is extended or adjusted under 35 U.S.C. 154(b) by 331 days.

(21) Appl. No.: 18/346,207

(22) Filed: Jul. 1, 2023

(65) Prior Publication Data

US 2024/0378864 A1    Nov. 14, 2024

(30) Foreign Application Priority Data

May 11, 2023 (CN) .......................... 202310533023.8

(51) Int. Cl.
*G06V 20/70* (2022.01)
*G06V 10/764* (2022.01)
*G06V 10/774* (2022.01)
*G06V 10/82* (2022.01)
*G06V 20/10* (2022.01)

(52) U.S. Cl.
CPC .......... *G06V 10/774* (2022.01); *G06V 10/764* (2022.01); *G06V 10/82* (2022.01); *G06V 20/194* (2022.01); *G06V 20/70* (2022.01)

(58) Field of Classification Search
CPC .... G06V 10/774; G06V 20/70; G06V 20/194; G06V 10/82; G06V 10/764; G06T 2207/10032; G06T 2207/10036
See application file for complete search history.

(56) References Cited

PUBLICATIONS

Yu et al., "$C^2$-CapsViT: Cross-Context and Cross-Scale Capsule Vision Transformers for Remote Sensing Image Scene Classification," in IEEE Geoscience and Remote Sensing Letters, vol. 19, pp. 1-5, 2022 (Year: 2022).*
Khodadadzadeh et al., "A Hybrid Capsule Network for Hyperspectral Image Classification," in IEEE Journal of Selected Topics in Applied Earth Observations and Remote Sensing, vol. 14, pp. 11824-11839, 2021 (Year: 2021).*
Hinton, "How to represent part-whole hierarchies in a neural network." Neural Computation 35.3 (2023): 413-452 (Year: 2023).*

(Continued)

*Primary Examiner* — Sumati Lefkowitz
*Assistant Examiner* — Michael Adam Shariff
(74) *Attorney, Agent, or Firm* — Cooper Legal Group, LLC

(57) ABSTRACT

A collaborative active learning classification method for hyperspectral images based on capsule networks is provided in the application, the method trains base classifiers CapsViT and CapsGLOM using an initial training set; calculates BvSB values of candidate samples using the CapsViT; uses the CapsGLOM to predict labels of the candidate samples; sorts the candidate samples according to the BvSB values; puts the candidate samples after sorting into corresponding collectors according to category labels estimated by the CapsGLOM; labels information samples; updates the initial training set and candidate sample set and retrains the CapsViT and CapsGLOM; and obtains the classification results based on CapsViT and CapsGLOM after iteration.

7 Claims, 5 Drawing Sheets

(56) References Cited

PUBLICATIONS

Paoletti et al., "Capsule Networks for Hyperspectral Image Classification," in IEEE Transactions on Geoscience and Remote Sensing, vol. 57, No. 4, pp. 2145-2160, Apr. 2019 (Year: 2019).*

Hong et al., "SpectralFormer: Rethinking hyperspectral image classification with transformers." IEEE Transactions on Geoscience and Remote Sensing 60 (2021): 1-15 (Year: 2021).*

Yu et al., "CapVIT: Cross-context capsule vision transformers for land cover classification with airborne multispectral LiDAR data." International Journal of Applied Earth Observation and Geoinformation 111 (2022) (Year: 2022).*

Li et al., "A survey on capsule networks: Evolution, application, and future development." 2021 International Conference on High Performance Big Data and Intelligent Systems (HPBD&IS) IEEE, 2021 (Year: 2021).*

Liu et a. "Classifying hyperspectral images with capsule network and active learning"; IGARSS 2022-2022 IEEE International Geoscience and Remote Sensing Symposium; IEEE (Year: 2022).*

\* cited by examiner

COLLABORATIVE ACTIVE LEARNING CLASSIFICATION METHOD FOR HYPERSPECTRAL IMAGES BASED ON CAPSULE NETWORKS

CROSS-REFERENCE TO RELATED APPLICATIONS

This application claims priority to Chinese Patent Application No. 202310533023.8, filed on May 11, 2023, the contents of which are hereby incorporated by reference.

TECHNICAL FIELD

The application belongs to a technical field of hyperspectral remote sensing image classification, and in particular to a collaborative active learning classification method for hyperspectral images based on capsule networks.

BACKGROUND

Hyperspectral remote sensing images encode rich spectral and spatial information in many narrow and continuous spectral bands, and better describe distributions and types of ground objects, so the hyperspectral remote sensing images are widely used in urbanization analysis, greening detection, agricultural management and mineral detection. As a basic part of hyperspectral remote sensing data analysis and processing, hyperspectral image classification has become the hottest research topic. At the same time, hyperspectral image classification is also a basis of other subsequent processing, so it is very necessary to obtain accurate classification results.

Conventional classification methods mainly include the classification method based on sparse representation, the classification method based on support vector machine and the classification method based on morphology. Although the conventional classification methods are effective and classical, they have limited abilities to extract and represent the joint features of spectrum and space. With the rapid rise of artificial neural networks in computer vision, natural language processing and other fields, hyperspectral image classification methods based on deep learning have achieved remarkable results.

When there are only a few labeled samples, although cross-validation may be used to train a relatively optimal model, it is difficult for various deep models to give full play to their potential. Although relying on expertise or requiring a certain manual labeling cost, the active learning classification method is the most practical, efficient and effective method in hyperspectral image classification method based on the deep models. In recent years, scholars at home and abroad have done a lot of research on active learning methods for hyperspectral image classification and put forward active learning methods based on uncertainty, representativeness, performance and loss prediction. Different active learning methods employ different query strategies, and the common goal of these query strategies is to search the sample with the largest amount of information. When active learning encounters the depth models, the query strategy based on uncertainty is still the first choice, because the method based on uncertainty may significantly improve the performance of the classifier after several iterations. However, at present, most active learning methods based on uncertainty for hyperspectral image classification only consider uncertainty when selecting the most informative samples, and fail to consider the diversity of actively selected samples and the cost of expert labeling.

Under this background, the application designs a collaborative active learning method, which includes two base classifiers based on capsule networks and a collaborative active learning scheme that considers both the uncertainty and diversity of active selection samples and the cost of expert labeling.

SUMMARY

The application proposes a collaborative active learning classification method for hyperspectral images based on capsule networks, including two novel and excellent base classifiers and a collaborative active learning scheme considering the uncertainty and diversity of active selection samples and the cost of expert labeling.

In order to achieve above objectives, the application provides a collaborative active learning method based on capsule networks (CAPSNet), at least including two novel and excellent base classifiers CapsViT and CapsGLOM and a collaborative active learning scheme considering the uncertainty and diversity of active selection samples and the cost of expert labeling. The method includes following steps:

S1, training base classifiers CapsViT and CapsGLOM using an initial training set, where the CapsViT and the CapsGLOM are two base classifiers for a hyperspectral remote sensing image classification, the CapsViT is used to calculate an uncertainty of candidate samples, where the candidate samples are sample blocks with candidate spectral samples as central pixels, and the CapsGLOM is used to assist expert labeling and ensure a diversity of active selection samples.

S2, calculating BvSB values of the candidate samples by using the CapsViT;

S3, using the CapsGLOM to predict labels of the candidate samples;

S4, sorting the candidate samples according to the BvSB values;

S5, putting the candidate samples after sorting into corresponding collectors according to category labels estimated by the CapsGLOM:

S6, requesting experts to label a first sample with preset information at each of the collectors, and requesting the experts to label a second sample if labeling the first sample is difficult for the experts;

S7, updating and training the CapsViT and the CapsGLOM based on samples being labeled; and S8, obtaining hyperspectral remote sensing image classification results based on the CapsViT and the CapsGLOM obtained by training.

Optionally, a process of training the CapsViT by using the initial training set includes:

using a convolution layer and a convolution cycle gating unit module to learn local and non-local cross-channel spectral dependencies, and the formula is:

$$f_0 = ReLU(BN(W_0 * X_{batch} + b_0));$$

where * represents a 2-D convolution operation, $W_0$ and $b_0$ are a weight and a bias respectively, BN represents a batch normalization, and $X_{batch}$ represents a mini-batch training samples; and an output of a first convolution layer is divided into eight equal parts along a feature channel dimension and using as inputs of a module of ConvGRU at each time step; and outputs of the ConvGRU at the each time step are expressed as:

$$z_t = \sigma(W_{xz} * x_t + W_{hz} * h_{t-1})$$
$$r_t = \sigma(W_{xr} * x_t + W_{hr} * h_{t-1})$$
$$g_t = \tanh(W_{xg} * x_t + W_{hg} * (r_t \otimes h_{t-1}))$$
$$y_t = h_t = z_t \otimes h_{t-1} + (1 - z_t) \otimes g_t$$

where $W_{xz}$, $W_{xr}$ and $W_{xg}$ are convolution kernels of each gate controller for an input $x_t$, $W_{hz}$, $W_{hr}$, and $W_{hg}$ are convolution kernels of a state $h_t$, $\otimes$ represents an element-by-element product, $\sigma$ represents a sigmoid activation function, tanh represents an hyperbolic tangent activation function, $h_{t-1}$ represents a state of a last time step; outputs $y_i$, $y_2 \ldots y_8 \in R^{batch \times 12 \times 9 \times 9}$ of a first layer of the ConvGRU at the each time step are used as inputs of a second layer of the ConvGRU.

Optionally, the process of training the CapsGLOM by using the initial training set includes:
using the module of the ConvGRU with two layers to learn the local and non-local cross-channel spectral dependencies and performing a group normalization;
carrying out a feature extraction on output features after the group normalization;
inputting extracted features into a multi-level embedded learning module of a GOLM system to learn islands in each level to obtain comprehensive features; and
using a cross entropy as a loss function to train a CapsGLOM model.

Optionally, a process of calculating the BvSB values of the candidate samples by using the CapsViT includes:
making $X^L$ as a labeled sample set and $X^C$ as a candidate sample set;
using $X^L$ to train the CapsViT; and
sending $X^C$ to the CapsViT to calculate a BvSB value of each of the candidate samples.

Optionally, a method for calculating the BvSB includes:
for any unlabeled sample $x_t$, making $y_i = (y_{i1}, y_{i2}, \ldots, y_{iC})^T$ represent a category membership probability value of $x_t$ estimated by a trained model, then an uncertainty of the unlabeled sample based on the BvSB is expressed as:

$$BvSB(x_i) = P_B(y_i) - P_{SB}(y_i)$$

where $P_B(y_i)$ represents the highest probability value in estimated $y_i$, and $P_{SB}(y_i)$ represents the second highest probability value in the estimated $y_i$.

Optionally, a process of sorting the candidate samples according to the BvSB values includes:

indices=argsort(BvSB($X^C$))

where $X^C$ is the candidate sample set.

Optionally, a process of the CapsGLOM to estimate the category labels includes:
CapsGLOM integrates a scene-level embedding of each image block position to perform classification and obtain the category labels.

Optionally, a process of performing classification by using the scene-level embedding includes:
sending the scene-level embedding of each position to a 1-D convolution layer to learn the comprehensive features used for a final classification.

Compared with the prior art, the application has following beneficial effects:

The collaborative active learning method based on capsule networks for the hyperspectral image classification designed in this application may fully consider the diversity of actively selected samples and the cost of expert labeling, and obtain satisfactory classification results.

BRIEF DESCRIPTION OF THE DRAWINGS

In order to explain the technical scheme of this application more clearly, the drawings needed in the embodiments are briefly introduced below. Obviously, the drawings in the following description are only some embodiments of this application. For ordinary technicians in this field, other drawings may be obtained according to these drawings without paying creative labor.

DETAILED DESCRIPTION

In the following, the technical scheme in the embodiment of the application will be clearly and completely described with reference to the drawings in the embodiment of the application. Obviously, the described embodiments are only a part of the embodiments of the application, but not the whole embodiments. Based on the embodiments in this application, all other embodiments obtained by ordinary technicians in this field without creative work belong to the protection scope of this application.

In order to make the above objects, features and advantages of this application more obvious and easier to understand, the application will be further described in detail with the attached drawings and specific embodiments.

Embodiment 1

Figure 1:
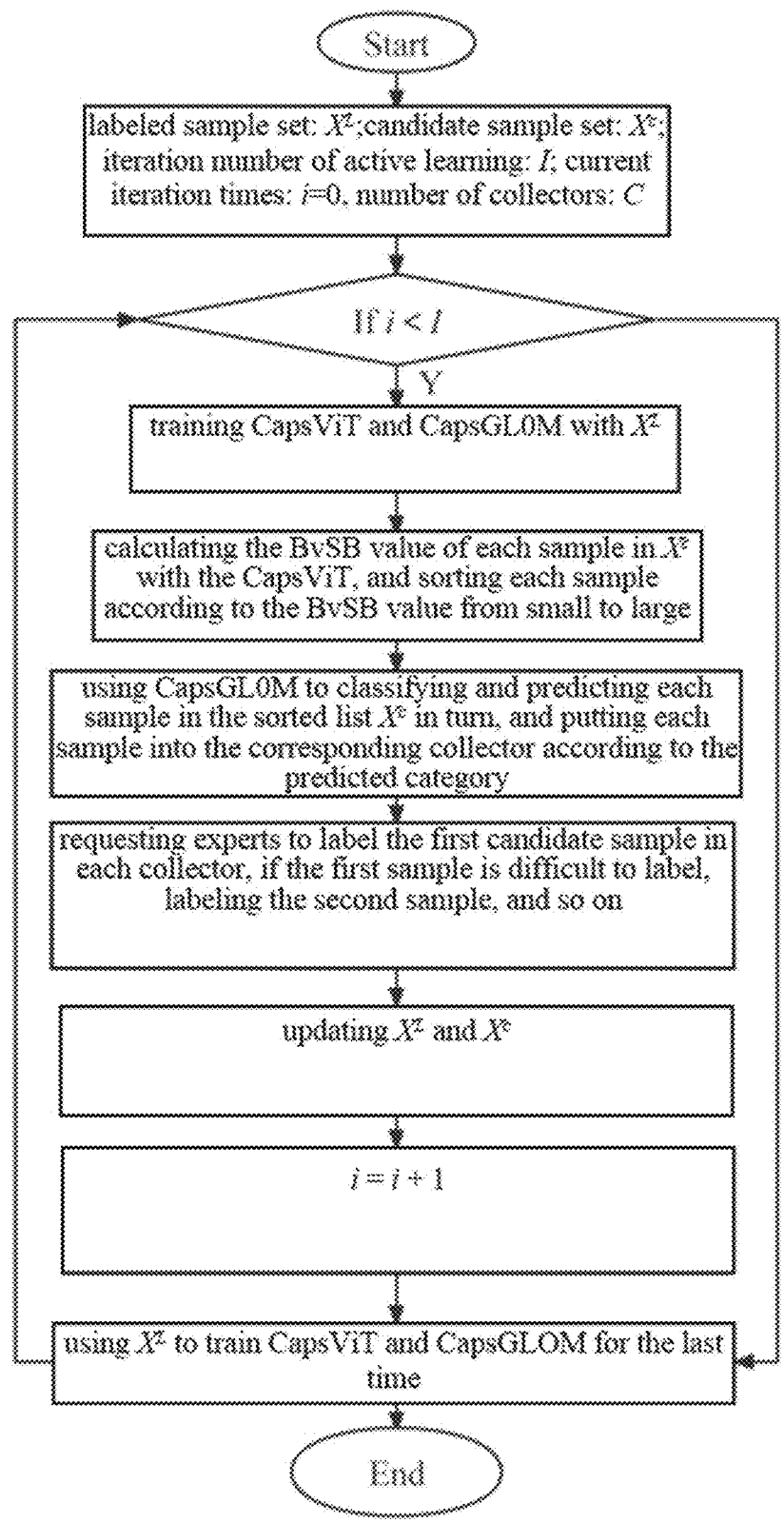
FIG. 1 is a flow chart of a collaborative active learning classification method for hyperspectral images based on capsule networks according to an embodiment of the present application.

In this embodiment, as shown in FIG. 1, a collaborative active learning classification method for hyperspectral images based on capsule networks includes:
S1, training base classifiers CapsViT and CapsGLOM using an initial training set, where the CapsViT and the CapsGLOM are two base classifiers for hyperspectral remote sensing image classification; the CapsViT uses a convolution layer and a convolution cycle gating unit module with two hidden layers to learn local and non-local cross-channel spectral dependencies; and the CapsGLOM is used to learn local and non-local cross-channel spectral dependencies;

S2, calculating BvSB values of candidate samples by using the CapsViT; Vision Transformer (ViT) is introduced into an original CapsNet, which fully considers a correlation between features of each capsule, making the features of each capsule more representative and discriminating. The candidate samples are sample blocks with candidate spectral samples as central pixels;

S3, using the CapsGLOM to predict labels of the candidate samples; it refers to a method of constructing primary capsules by CapsNet to learn a multi-level embedding of samples in each image block position, and uses a multi-level embedding learning module in a GLOM system proposed by Geoffrey Hinton to learn consensus views at each level.

The application includes at least two base classifiers that may learn a global capsule feature correlation, that is the CapsViT and the CapsGLOM; and at least one collaborative active learning scheme not only considering the uncertainty and diversity of actively selected samples, but also taking into account the cost of expert labeling. The two base classifiers in this collaborative active learning method may also be flexibly replaced by other excellent classifiers, as long as these classifiers may handle samples with the same form (dimension).

Figure 2:
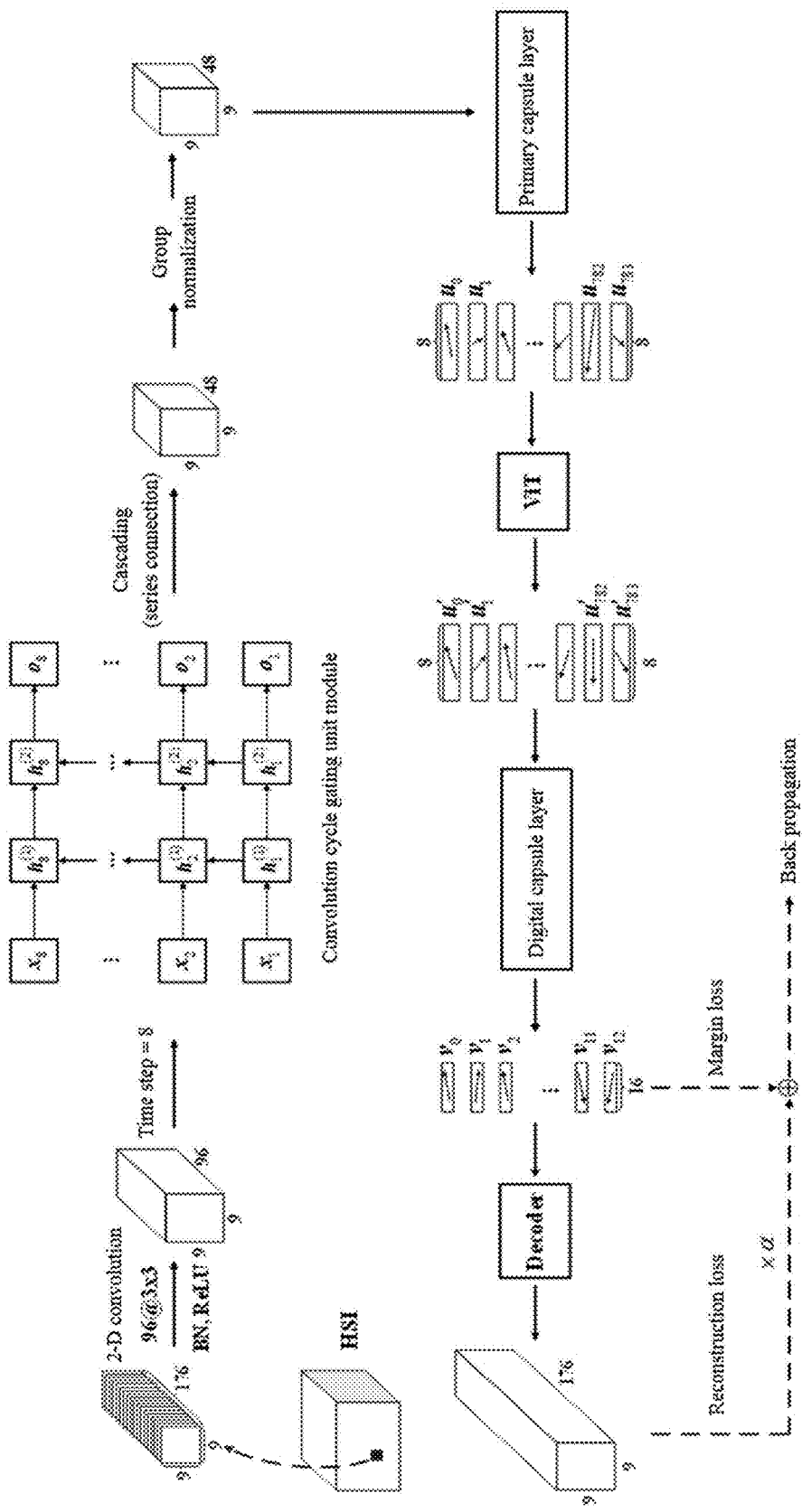
FIG. 2 is a first base classifier CapsViT of a collaborative active learning method based on capsule networks according to an embodiment of the present application.

1) the First Base Classifier CapsViT:

As shown in FIG. 2, the CapsViT is an end-to-end model without requiring dimensionality reduction pretreatment. Firstly. CapsViT uses the convolution layer and the Convolution Gated Recurrent Unit (ConvGRU) module with the two hidden layers to learn the local and non-local cross-channel spectral dependencies. A dataset of Kennedy Space Center (KSC) is taken as an example. The dataset contains 176 spectral bands, and a spatial size of a selected training sample block is 9×9. A small batch of training samples $X_{batch} \in R^{batch \times 176 \times 9 \times 9}$ is sent to a first convolution layer:

$$f_0 = ReLU(BN(W_0 * X_{batch} + b_0)) \quad (1)$$

Figure 3:
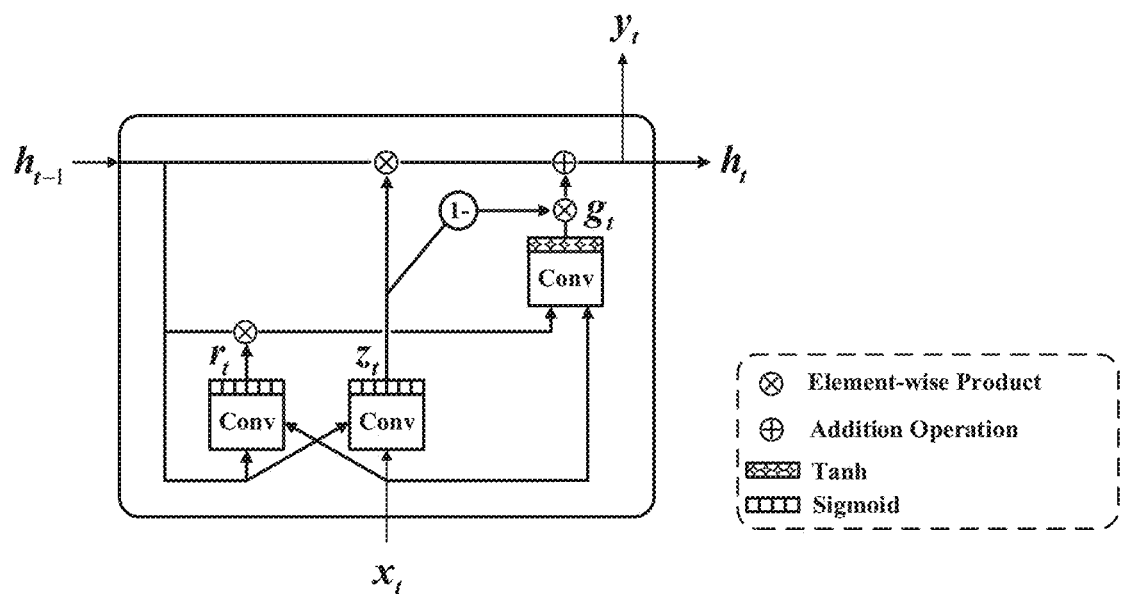
FIG. 3 is a structural diagram of a convolution gating cycle unit of the collaborative active learning method based on capsule networks according to an embodiment of the present application.

In the expression, * represents a 2-D convolution operation, $W_0$ and $b_0$ are a weight and a bias respectively, BN represents a batch normalization. There are 96 convolution kernels in this layer, and the size of receptive field is 3×3. An output of the first convolution layer $f_0 \in R^{batch \times 96 \times 9 \times 9}$ is divided into eight equal parts along a feature channel dimension to be used as inputs of a module of ConvGRU at each time step. The module of the ConvGRU consists of two layers of the ConvGRU, and its structure diagram is given in FIG. 3. For the first layer of ConvGRU, there are 12 convolution cores in each gate controller, and for the second layer of the ConvGRU, there are 6 convolution cores in each gate controller. Making $x_1, x_2, \ldots, x_8 \in R^{batch \times 12 \times 9 \times 9}$ represent an input of the module of the ConvGRU at each time step, and the output of the first layer of the ConvGRU at each time step may be expressed as:

$$z_t = \sigma(W_{xz} * x_t + W_{hz} * h_{t-1}) \quad (2)$$
$$r_t = \sigma(W_{xr} * x_t + W_{hr} * h_{t-1})$$
$$g_t = \tanh(W_{xg} * x_t + W_{hg} * (r_t \otimes h_{t-1}))$$
$$y_t = h_t = z_t \otimes h_{t-1} + (1 - z_t) \otimes g_t$$

Where $W_{xz}$, $W_{xr}$ and $W_{xg}$ are convolution kernels of each gate controller for an input $x_t$, $W_{hz}$, $W_{hr}$ and $W_{hg}$ are convolution kernels of a state $h_t$, $\otimes$ represents an element-by-element product, $\sigma$ represents a sigmoid activation function, tanh represents an hyperbolic tangent activation function, $h_{t-1}$ represents a state of a last time step; outputs $y_1$, $y_2 \ldots$ of a first layer of the ConvGRU at the each time step, $y_B \in R^{batch \times 12 \times 9 \times 9}$ is used as an input of a second layer of the ConvGRU. Finally, outputs $o_1, o_2, \ldots, o_8 \in R^{batch \times 6 \times 9 \times 9}$ of 8 time steps in the second layer of the ConvGRU are obtained. Although $o_8$ integrates $o_1, o_2, \ldots, o_7$, in order to fully mine a dependence between shallow and deep spectrums, $o_1, o_2 \ldots, o_8$ are connected in series as the output of the whole module of the ConvGRU. In addition, in order to make the learning process fast and stable, a Group Normalization (GN) with a grouping parameter of 8 (corresponding to 8 time steps) is adopted.

Next, the obtained features are sent to the PrimaryCaps layer of the capsule network, this layer has 128 convolution kernels with a receptive field size of 3×3 in this layer. In order to adjust the number of primary capsules obtained, this layer applies an unfilled convolution. By integrating 8 neurons into one capsule along the channel dimension. 784 (16×7×7) primary capsules $u_0, u_1, \ldots, u_{783}$ may be obtained. The mode of the primary capsule represents a probability of the appearance of a certain entity feature, and its direction represents the pose information about the entity feature. Each entity feature appears in a specific area of the unit hypersphere. In order to fully learn the global correlation among all primary capsules, the primary capsules obtained from the PrimaryCaps layer are sent to the ViT to learn the best representation of the primary capsules of each "position". ViT-treated primary capsules are denoted as $u'_0, u'_1, \ldots, u'_{783}$, which are more discriminating and have a positive impact on classification.

Finally, there are 13 DigitalCaps $v_0, v_1, \ldots, v_{12}$ corresponding to the 13 land types in the KSC data set. The digital capsule corresponding to the training sample label is input to the decoder to reconstruct the input sample. The decoder consists of a fully connected (FC) layer and three transposed convolution layers. In the process of back propagation, the following formula is used as the loss function to train the whole CapsViT model:

$$L = \frac{1}{N} \sum_{n=1}^{N} \left[ \left( \sum_j L_{nj}^{margin} \right) + \alpha L_n^{recon} \right] \quad (3)$$

In the formula, $L_{nj}^{margin}$ represents the margin loss of the training sample n relative to the digital capsule $v_j$, $L_n^{recon}$ represents the reconstruction loss, which can be calculated by a root mean square error (RMSE), $\alpha$ represents the regularization coefficient. Because the network focuses on the classification task, the value of a is usually a small value, such as 0.01, to represent the size of the batch.

Figure 4:
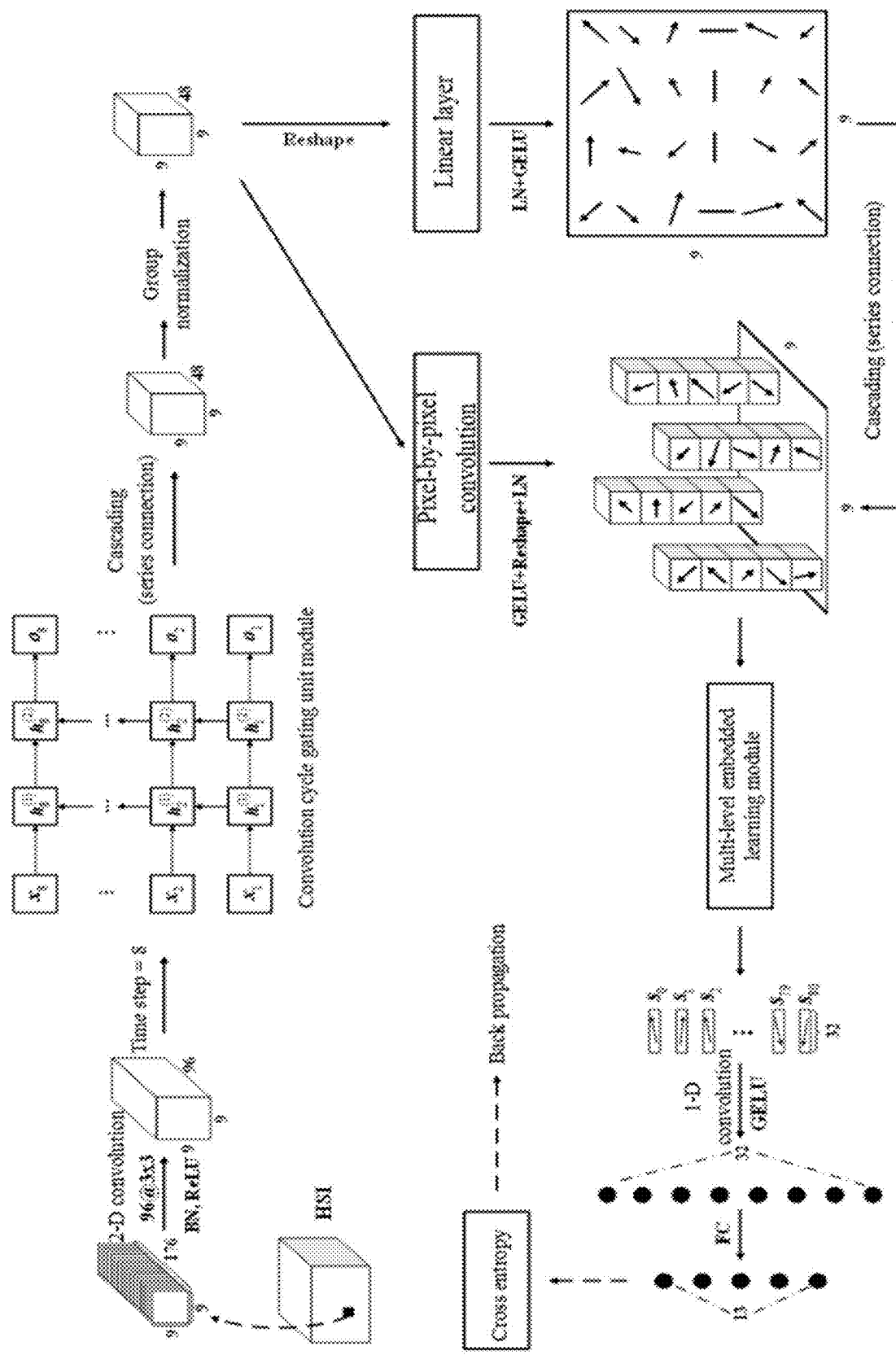
FIG. 4 is a second base classifier CapsGLOM of the collaborative active learning method based on capsule networks according to an embodiment of the present application.

2) the Second Base Classifier CapsGLOM:

As shown in FIG. 4, CapsGLOM draws lessons from CapsNet's method of constructing primary capsules, and uses 2-D convolution to learn different multi-level embedding in different positions. CapsGLOM refers to a method of constructing primary capsules by CapsNet and uses a 2-D convolution to learn different multi-level embeddings in different positions, and then uses the multi-level embedding learning module of the GLOM system to learn consensus views of each layer (that is, the island composed of almost identical vectors). The first half of the CapsGLOM is the same as the CapsViT, that is, the two-layer ConvGRU module is used to learn the local and non-local cross-channel spectral dependencies, and then the group normalization is performed.

Next, there are two branches, the first of which uses the complete connection layer to learn underlying features of each location, these features are used as inputs to the bottom-up network to predict the lowest level of embedding. In the CapsGLOM, the position is defined as the position of each pixel in the feature map. The acquisition of the underlying features at each location may be expressed by the following formula $$f_{under} = GELU(LN(\text{Reshape}(f_1)W_1 - b_1)) \qquad (4)$$

in the formula, $f_1 \in R^{batch \times 48 \times 9 \times 9}$ represents output features of the group normalization layer, GELU(Gaussian Error Linear Unit) represents an activation function of Gaussian error linear unit, $\text{Reshape}(f_1) \in R^{batch \times 81 \times 48}$ represents a remodeling operation for $f_1$, and linear $W_1 \in R^{48 \times 32}$ and $b_1 \in R^{32}$ respectively represents the weight and bias of the fully connected layer, $f_{under} \in R^{batch \times 81 \times 32}$ represents the learned bottom-level features with 32 dimensions.

The second branch uses 2-D convolution to learn the embedding features $f_{lowest}$, $f_{sub-part}$, $f_{part}$, $f_{object}$, $f_{scene}$ embedded in five levels of lowest level, sub-part level, part level, object level and scene level at each image block position. Since each "pixel" is defined as a location, pixel-by-pixel convolution (i.e., 1×1 convolution) is used here to learn a multi-level embedding at each location.

$$(f_{scene}, f_{object}, f_{part}, f_{sub-part}, f_{lowest})^T = \qquad (5)$$
$$LN(\text{Reshape}(GELU(W_2 * f_1 + b_2)))$$

Figure 5:
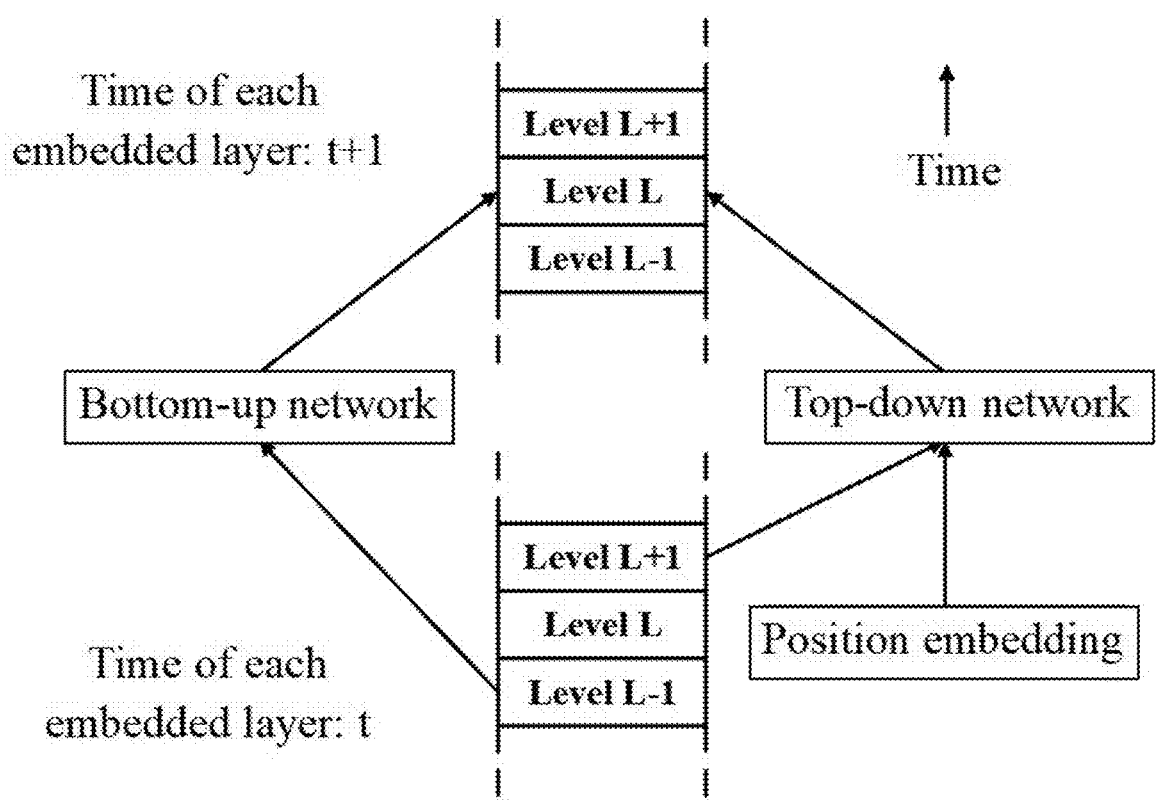
FIG. 5 is a schematic diagram of a GLOM system of the collaborative active learning method based on capsule networks, for top-down and bottom-up predictions of embeddings at two adjacent levels of a single image block position according to an embodiment of the present application.

In the formula, $W_2$ and $b_2$ represent the weight and bias of 1×1 pixel-by-pixel convolution respectively. The bottom features and multi-level embedded features learned at each position are input to the multi-level embedded learning module of the GLOM system to learn the island composed of almost identical vectors at each level. In CapsGLOM, both bottom-up and top-down networks are composed of two linear layers and the activation function is GELU. The working schematic diagram of the two networks is shown in FIG. 5, and embeddings at each level predicted by them may be expressed by the following formula:

$$(f_{scene}, f_{object}, f_{part}, f_{sub-part}, f_{lowest})^T \leftarrow \qquad (6)$$
$$\text{bootom-up}(f_{object}, f_{part}, f_{sub-part}, f_{lowest}, f_{under})$$
$$(f_{object}, f_{part}, f_{sub-part}, f_{lowest})^T \leftarrow$$
$$\text{top-down}(f_{scene}, f_{object}, f_{part}, f_{sub-part})$$

$f_{under}$ represents the embedded feature of the lowest layer at the position of each image block;

making $E_t = (f_{scene}, f_{object}, f_{part}, f_{sub-part}, f_{lowest})^T$ represent the multi-level embedding of all positions at time t, then at time t+1, it can be updated by the following formula:

$$E_{t+1} = [\text{bottom-up}(E_t, f_{under}) + \text{top-down}(E_t) + E_{t+1} \text{ Interact}(E_t)]/(3, 4, 4, 4, 4)^T \qquad (7)$$

in the formula Interact($E_t$) represents the interaction between embedded vectors in different positions in the same level:

$$\text{Interact}(E_t) = \text{softmax}\left(\frac{E[\text{normalize}(E)]^T}{\sqrt{d}}\right) E \qquad (8)$$

where "normalize" represents the normalization operation of vectors, and d represents the dimension of embedded features at each level, that is, 32.

Because the classification task is to be performed, and each position (pixel) may represent a background pixel or other types of ground objects, the CapsGLOM integrates the scene-level embeddings of each image block position to perform classification. The scene-level embedding of each position is sent to a 1-D convolution layer to learn the comprehensive features that are finally used for classification. Finally, a cross entropy is used as a loss function to train the whole model.

S4, sorting the candidate samples according to the BvSB values;

S5, putting the candidate samples after sorting into corresponding collectors according to the category labels estimated by the CapsGLOM; using the CapsViT to calculate the BvSB values of the candidate samples and sorting the candidate samples according to the BvSB values from small to large; using the CapsGLOM to classify the sorted candidate samples and putting them into each preset collector in sequence according to the classification results: requesting experts to label a first candidate sample in each collector, and requesting the experts to label a second sample if labeling the first sample is difficult for the experts, by analogy, a candidate sample is marked in each collector to expand the training set.

3) a Collaborative Active Learning Scheme:

This application designs a collaborative active learning scheme, which takes into account the uncertainty and diversity of actively selected samples and the cost of expert labeling. It is an active learning method based on uncertainty and adopts uncertainty measure based on BvSB as query strategy. For any unlabeled sample $x_i$, making $y_i = (y_{i1}, y_{i2}, \ldots, y_{iC})^T$ represent a category membership probability value of $x_i$ estimated by a trained model, then expressing an uncertainty of the sample based on the BvSB as:

$$BvSB(x_i) = P_B(y_i) - P_{SB}(y_i); \qquad (9)$$

where $P_B(y_i)$ represents the highest probability value in the estimated $y_i$, and $P_{SB}(y_i)$ represents the second highest probability value in the estimated $y_i$. For this query strategy, the smaller the BvSB value of the sample, the fuzzier the classifier's judgment on the sample category.

In the designed collaborative active learning scheme, the CapsViT is used to calculate the uncertainty of candidate samples, and the CapsGLOM is used to assist expert labeling to ensure the diversity of actively selected samples. Making $X^L$ as a labeled sample set and $X^C$ as a candidate sample set. In each active learning iteration, first using $X^L$ to train the CapsViT and the CapsGLOM. Then sending $X^C$ to the CapsViT to calculate the BvSB value of each of the candidate samples, and sending the BvSB values to CapsGLOM for classification. Assuming that there are M candidate samples, that is, $X^C=\{x_1^C, x_2^C, \ldots, x_M^C\}$, an index of the BvSB values calculated by the CapsViT in ascending order may be obtained:

$$\text{indices} = \text{argsort}(BvSB(X^C)); \quad (10)$$

next, creating a dictionary for the CapsGLOM with key values of 0, 1, . . . , C−1, and each key corresponds to a collector (empty list). Making indices={ind_0, ind_1, . . . , ind_(M−1)}, the candidate samples may be reordered as $\{X^C[\text{ind\_0}], X^C[\text{inde\_1}], \ldots, X^C[\text{ind\_}(M-1)]\}$. Sequentially adding the re-ordered candidate samples to the collector with the category estimated by CapsGLOM as the key.

S6, requesting experts to label a first sample with preset information at each of the collectors, and requesting the experts to label a second sample if it is difficult for experts to label the first sample;

S7, updating and training the CapsViT and the CapsGLOM based on samples being labeled; and S8, obtaining hyperspectral remote sensing image classification results based on CapsViT and CapsGLOM obtained by training.

In this way, the BvSB values of samples in each collector still keep the order from small to large. Finally, only the first sample in each collector is selected for expert labeling. If the expert has difficulty labeling the first sample in a particular collector, the expert may try labeling the second sample, and so on. Therefore, the proposed collaborative active learning method not only considers the uncertainty and diversity of actively selected samples, but also considers the cost of expert labeling.

Finally, it should be explained that the above embodiments are only used to illustrate the technical scheme of the application, but not to limit it. Although the application has been described in detail with reference to the preferred embodiments, ordinary technicians in the field should understand that they can still modify or replace the technical scheme of the application, and these modifications or equivalent substitutions cannot make the modified technical scheme deviate from the spirit and scope of the technical scheme of the application.

Embodiment 2

In order to illustrate the effectiveness of this application, following experiments are conducted. Evaluation indexes used in the experiment include overall accuracy (OA), average accuracy (AA) and Kappa coefficients.

A data set from the Kennedy Space Center (KSC) is used in the first group of experiments, the data set has 176 spectral bands and a spatial size of 512×614, including 13 types of ground objects, with a total of 5211 samples except background pixels. The spatial size of the sample block used in the experiment is 9×9, and only one sample is randomly selected from each category to construct an initial training set. The remaining 5198 samples are regarded as test samples and candidate samples, and the number of active learning iterations is set to 4 times, that is, actively labeling 52 samples. The classification results of the first group are shown in Table 1.

TABLE 1

| Evaluation indexes | Initial training set | | Active learning iteration = 2 | | Active learning iteration = 4 | |
|---|---|---|---|---|---|---|
| | CapsViT | CapsGLOM | CapsViT | CapsGLOM | CapsViT | CapsGLOM |
| OA | 67.76 | 70.28 | 90.32 | 90.38 | 93.34 | 94.31 |
| AA | 60.28 | 64.76 | 82.99 | 83.61 | 88.81 | 89.20 |
| Kappa | 0.6400 | 0.6691 | 0.8922 | 0.8928 | 0.9259 | 0.9366 |

A 2013 data set from the University of Houston is used in the second group of experiments, this data set includes 144 spectral bands and 349×1905 pixels, with a spatial resolution of 2.5 meters, and includes 15 kinds of complex ground objects. For this data set, there are 15,029 samples except background pixels. Five samples in each category are randomly selected as initial training samples, and the remaining samples are used as test samples and candidate samples. In addition, the number of active learning iterations is set to 5 times, that is, actively labeling 75 samples. The second group of classification results are shown in Table 2.

TABLE 2

| Evaluation indexes | Initial training set | | Active learning iteration = 3 | | Active learning iteration = 5 | |
|---|---|---|---|---|---|---|
| | CapsViT | CapsGLOM | CapsViT | CapsGLOM | CapsViT | CapsGLOM |
| OA | 75.01 | 73.93 | 86.00 | 87.44 | 91.21 | 91.09 |
| AA | 78.65 | 77.88 | 88.06 | 88.98 | 92.36 | 92.25 |
| Kappa | 0.7304 | 0.7184 | 0.8487 | 0.8643 | 0.9050 | 0.9037 |

In the first and second groups of experiments, CapsViT and CapsGLOM both achieved good classification results on the initial training set. In Table 1 and Table 2, after only a few candidate samples were labeled, CapsViT and CapsGLOM both achieves obvious improvement in three indexes.

The above-mentioned embodiments are only a description of the preferred mode of this application, not a limitation on the scope of this application. Without departing from the design spirit of this application, various modifications and improvements made by ordinary technicians in this field to the technical scheme of this application shall fall within the protection scope determined by the claims of this application.

What is claimed is:

1. A collaborative active learning classification method for hyperspectral images based on capsule networks, comprising following steps:

S1, training base classifiers CapsViT and CapsGLOM using an initial training set, wherein the CapsViT and the CapsGLOM are two base classifiers for a hyperspectral remote sensing image classification, the CapsViT is used to calculate an uncertainty of candidate samples, the candidate samples are sample blocks with candidate spectral samples as central pixels, and the CapsGLOM is used to assist expert labeling and ensure a diversity of active selection samples;

S2, calculating BvSB values of the candidate samples by using the CapsViT;

S3, using the CapsGLOM to predict labels of the candidate samples;

S4, sorting the candidate samples according to the BvSB values;

S5, putting the candidate samples after sorting into corresponding collectors according to category labels estimated by the CapsGLOM;

S6, requesting experts to label a first sample with preset information at each of the collectors, and requesting the experts to label a second sample when the experts are unable to label the first sample to obtain labeled samples;

S7, updating and training the CapsViT and the CapsGLOM based on the labeled samples; and S8, obtaining hyperspectral remote sensing image classification results based on the CapsViT and the CapsGLOM obtained by training, wherein, training the CapsViT comprises using a convolution layer with a convolution kernel of 96 and a convolution gated recurrent unit module to learn local and non-local cross-channel spectral dependency feature maps of a hyperspectral image, and then performing a group normalization; inputting the local and non-local cross-channel spectral dependency feature maps into a primary capsule layer of the capsule networks to obtain a digital capsule; inputting primary capsules into a ViT module; learning global correlation among all the primary capsules to obtain discriminative primary capsules; and inputting the discriminative primary capsules into the digital capsule for classification of the hyperspectral image;

wherein, training the CapsGLOM comprises using the convolution layer with the convolution kernel of 96 and the convolution gated recurrent unit module to learn the local and non-local cross-channel spectral dependency feature maps of the hyperspectral image, and then performing the group normalization; using a fully connected layer to learn embedded features of a low layer of group normalized feature maps at each pixel position; using two-dimensional (2-D) convolution to obtain a lowest level, sub-part level, part level, object level, and scene level embedded features at the each pixel position in the group normalized feature maps; calculating interactions between embedded vectors in different positions of each level based on the lowest level, sub-part level, part level, object level, and scene level embedded features; and using a one-dimensional (1-D) convolution layer to achieve classification based on interaction results;

wherein the BvSB values are category membership probability values, wherein a method for calculating each of the BvSB values comprises:

for any unlabeled sample $x_i$, making $y_i = (y_{i1}, y_{i2}, \ldots, y_{ic})^T$ represent a category membership probability value of xi estimated by a trained model, and then expressing an uncertainty of an unlabeled sample based on the BvSB as:

$$BvSB(x_i) = P_B(y_i) - P_{SB}(y_i)$$

wherein $P_B(y_i)$ represents a highest probability value in estimated $y_i$, and $P_{SB}(y_i)$ represents a second highest probability value in the estimated $y_i$.

2. The collaborative active learning classification method for hyperspectral images based on capsule networks according to claim 1, wherein a process of training the CapsViT by using the initial training set comprises:

using the convolution layer and a convolution cycle gating unit module to learn local and non-local cross-channel spectral dependencies, wherein a formula is:

$$f_0 = ReLU(BN(W_0 * X_{batch} + b_0))$$

wherein * represents a 2-D convolution operation, $W_0$ and $b_0$ are a weight and a bias respectively, BN represents a batch normalization, and $X_{batch}$ represents a mini-batch training sample; and dividing an output of a first convolution layer into eight equal parts along a feature channel dimension and using as inputs of ConvGRU module at each time step;

wherein outputs of the ConvGRU module at the each time step are expressed as:

$$z_t = \sigma(W_{xz} * x_t + W_{hz} * h_{t-1})$$
$$r_t = \sigma(W_{xr} * x_t + W_{hr} * h_{t-1})$$
$$g_t = \tan h(W_{xg} * x_t + W_{hg} * (r_t \otimes h_{t-1}))$$
$$y_t = h_t = z_t \otimes h_{t-1} + (1 - z_t) \otimes g_t$$

wherein $W_{xz}$, $W_{xr}$ and $W_{xg}$ are convolution kernels of each gate controller for an input $x_t$, $W_{hz}$, $W_{hr}$ and $W_{hg}$ are convolution kernels of a state $h_t$, $\otimes$ represents an element-wise product, o represents a sigmoid activation function, tanh represents an hyperbolic tangent activation function, $h_{t-1}$ represents a state of a last time step; outputs $y_1, y_2 \ldots y_8 \in R^{batch \times 12 \times 9 \times 9}$ of a first layer of the ConvGRU module at the each time step are used as inputs of a second layer of the ConvGRU module.

3. The collaborative active learning classification method for hyperspectral images based on capsule networks according to claim 2, wherein a process of training the CapsGLOM by using the initial training set comprises:
  using the ConvGRU module with two layers to learn the local and non-local cross-channel spectral dependencies and performing the group normalization;
  carrying out a feature extraction on output features after the group normalization;
  inputting extracted features into a multi-level embedded learning module of a GLOM system to learn islands in each level to obtain comprehensive features; and
  using a cross entropy as a loss function to train a Caps-GLOM model.

4. The collaborative active learning classification method for hyperspectral images based on capsule networks according to claim 2, wherein a process of calculating the BvSB values of the candidate samples by using the CapsViT comprises:
  making $X^L$ as a labeled sample set and $X^C$ as a candidate sample set;
  using $X^L$ to train the CapsViT; and
  sending $X^C$ to the CapsViT to calculate a BvSB value of each of the candidate samples.

5. The collaborative active learning classification method for hyperspectral images based on capsule networks according to claim 4, wherein a process of sorting the candidate samples according to the BvSB values comprises:

$$indices = \mathrm{argsort}(BvSB(X^C))$$

wherein $X^C$ is the candidate sample set.

6. The collaborative active learning classification method for hyperspectral images based on capsule networks according to claim 1, wherein a process of the CapsGLOM to estimate the category labels comprises:
  CapsGLOM integrating a scene-level embedding of each image block position to perform classification and obtain the category labels.

7. The collaborative active learning classification method for hyperspectral images based on capsule networks according to claim 6, wherein a process of performing the classification by using the scene-level embedding comprises:
  sending the scene-level embedding of each position to the 1-D convolution layer to learn comprehensive features used for a final classification.

* * * * *